United States Patent [19]

Wenske et al.

[11] Patent Number: 5,650,058
[45] Date of Patent: Jul. 22, 1997

[54] ELECTROLYTIC CELL AND CAPILLARY GAP ELECTRODE FOR GAS-DEVELOPING OR GAS-CONSUMING ELECTROLYTIC REACTIONS AND ELECTROLYSIS PROCESS THEREFOR

[75] Inventors: Hanno Wenske, Grimma; Hermann Matschiner, Halle/Saale; Hans Siegel, Zwenkau, all of Germany

[73] Assignee: Maschinen-Und Anlagenbau Grimma GmbH (MAG), Grimma, Germany

[21] Appl. No.: 162,156

[22] PCT Filed: Jun. 22, 1992

[86] PCT No.: PCT/EP92/01402

§ 371 Date: Mar. 13, 1995

§ 102(e) Date: Mar. 13, 1995

[87] PCT Pub. No.: WO93/00459

PCT Pub. Date: Jan. 7, 1993

[30] Foreign Application Priority Data

Jun. 22, 1991 [DE] Germany .................. 41 20 679.7

[51] Int. Cl.⁶ .................................................. C25B 1/00
[52] U.S. Cl. .................. 205/615; 205/526; 205/532; 205/630; 204/252; 204/253; 204/257; 204/258; 204/263; 204/265; 204/266; 204/280; 204/282; 204/283; 204/290 R; 429/13; 429/27; 429/30; 429/41
[58] Field of Search ................... 204/252, 253, 204/257, 258, 263, 280, 283, 282, 290 R, 265, 266; 205/526, 532, 630, 615; 429/27, 13, 41, 30

[56] References Cited

U.S. PATENT DOCUMENTS

| | | | |
|---|---|---|---|
| 4,260,469 | 4/1981 | McIntyre et al. | 204/265 |
| 4,341,606 | 7/1982 | McIntyre et al. | 204/98 |
| 4,612,104 | 9/1986 | Holmes et al. | 204/272 |
| 4,627,897 | 12/1986 | Tetzlaff et al. | 204/59 |
| 4,931,168 | 6/1990 | Watanabe et al. | 204/283 |
| 5,087,344 | 2/1992 | Wenske et al. | 204/256 |
| 5,104,497 | 4/1992 | Tetzlaff et al. | 204/59 |
| 5,480,515 | 1/1996 | Gallien | 204/1.11 |

FOREIGN PATENT DOCUMENTS

| | | |
|---|---|---|
| 0159138A1 | 10/1985 | European Pat. Off. . |
| 0360536A2 | 3/1990 | European Pat. Off. . |
| 2308701 | 11/1976 | France . |
| 128436 | 6/1919 | United Kingdom . |
| WO88/03966 | 6/1988 | WIPO . |
| WO91/00379 | 1/1991 | WIPO . |
| WO92/22681 | 12/1992 | WIPO . |

OTHER PUBLICATIONS

Wolfgang Wendel et al., "Elektrochemische Zellen als Fallfilmapparat," *Wissenschaftliche Forschungsarbeit, Synopse 1685, Chem.–ing Tech, 60* (1988) p. 563. Considered for The Brief Explanation in the Specification. No Month Available.

*Primary Examiner*—Kathryn L. Gorgos
*Attorney, Agent, or Firm*—Panitch Schwarze Jacobs & Nadel, P.C.

[57] ABSTRACT

The invention includes an electrolytic cell for gas-developing or gas-consuming electrolytic reactions and processes, and an electrolysis process therefor. According to the invention, the capillary slit electrode has conduits enabling the separate flow of reaction gas and electrolyte/permeate in the electrode. The electrode is preferably hydrophilic in a narrow internal region for mounting on a separator, while elsewhere it is hydrophobic. Thus electrolyte/permeate penetrates only into the region of the capillary slit electrode near the separator, while the region away from the separator remains free of electrolyte/permeate, so facilitating the unimpeded flow of the reaction gas. The invention is applicable especially in electrolytic cells for chlor-alkali or hydrogen electrolysis, and in the construction of cells for the generation of power.

23 Claims, 4 Drawing Sheets

ELECTROLYTIC CELL AND CAPILLARY GAP ELECTRODE FOR GAS-DEVELOPING OR GAS-CONSUMING ELECTROLYTIC REACTIONS AND ELECTROLYSIS PROCESS THEREFOR

This is a national stage application of PCT/EP 92/01402 filed Jun. 22, 1992.

FIELD OF THE INVENTION

The present invention relates to an electrolytic cell for gas-developing or gas-consuming electrolytic reactions and processes, in particular for chlor-alkali or water electrolysis or as a fuel cell, with an electrolyte and at least one pair of electrodes separated by at least one separator and including at least one capillary gap electrode. The invention also relates to a capillary gap electrode and an electrolysis process for gas-developing or gas-consuming electrolysis processes.

BACKGROUND OF THE INVENTION

The electrodes used are of paramount importance to the efficiency of the electrolysis process, i.e., in chlor-alkali or water electrolysis for obtaining caustic soda solution, chlorine, hydrogen or hydrogen peroxide. These are to have a resistance which is as low as possible, thereby permitting a rapid discharge and supply of the reaction gas from the reaction region between cathode and anode.

The conventional constructional electrode types in chlor-alkali or water electrolyzers with highly active electrode materials are still very inefficient due to gas bubble charging of the electrolyte and gas bubble covering of the electrodes in the active region.

So far the use of gas diffusion electrodes has most of the time not been possible in electrochemical processes because of the excessive operating costs and the unsatisfactory material exchange of the gas-enriched porous electrodes that is observed in liquid-filled cells. The relatively low strength of the electrode/diaphragm/electrode combination and the partly inhomogeneous current distribution have so far limited technical implementations to small units. The manufacture and operational use of very thin and stable electrodes requires expensive technologies.

French Patent Specification 2 308 701 discloses an electrolysis apparatus with refractionated electrodes wherein the porous electrodes are partly coated with porous metal oxides and it is ensured by way of a pressure drop that gas bubbles can only espace from the back side of the electrode. Both the pores of the electrode base body and the metal oxide coating are filled with electrolyte. Such electrodes are expensive and it is difficult to remove residual gases from the pores after the electrolytic cell has been switched off.

As for the production of chlorine and caustic soda solution, a cell design became recently known as a falling film apparatus wherein a very thin, oxygen-consuming porous cathode of Ag/Polytetrafluoroethylene PTFE is used (Chem.-Ing.-Tech. 60 (1988) No. 7, p. 563). Oxygen is supplied to the porous electrode on the one hand while diluted caustic solution passes, on the other hand, between said electrode and the membrane from above and leaves the cell at the bottom side as an enriched caustic soda solution. The anode of actively coated expanded titanium material of a conventional type, as well as the cathode having a gap of a width of, for instance, about 0.6 mm are arranged relative to the membrane and are flooded with brine from above. The resultant chlorine exists at the back side from the anode and is discharged through an adjoining liquid-free compartment.

Moreover, WO 91/00379 discloses an electrolytic cell for gas-developing electrolytic processes in which the problems entailed by gas discharge from the active region and by high electric load are to be solved by using at least one capillary gap electrode in that there is a motional direction of the gas bubbles through the electrolyte-filled electrode substantially in a direction perpendicular to the membrane or in the direction of the electric field between anode and cathode by way of a suitable dimension of the capillary gap. In this case, too, the above-mentioned difficulties are, however, not overcome in a satisfactory way.

SUMMARY OF THE INVENTION

It is, therefore, the object of the present invention to improve an electrolytic cell of the above-mentioned kind in such a way that the ohmic resistance is substantially reduced and material transportation is improved at the same time and that manufacture and operation with great active surfaces and cell dimensions are possible in an uncomplicated way.

It is also the object of the present invention to improve a capillary gap electrode for the formation of electrolytic cells and for electrolytic processes in such a way that the capillary gap electrode has considerably improved qualities of use, in particular a substantially reduced ohmic resistance together with a considerably improved material transportation capacity.

It is also the object of the present invention to indicate an electrolysis process for gas-developing or gas-consuming electrolytic reactions and electrolysis processes in electrolytic cells for improving the performance-parameters of electrolytic cells having at least one capillary gap electrode, in particular ohmic resistance and substance transportation.

The above object is attained in an electrolytic cell of the above-mentioned type according to the invention in that the capillary gap electrode comprises means for separately guiding electrolyte or permeate and reaction gas.

To this end, the electrolytic cell preferably comprises at least one thin hydrophilic, electrolytically active reaction region adjacent to the separator and a larger hydrophobic, electrolytically inactive gas transportation region as separate guides for the electrolyte or permeate and the reaction gas. The hydrophilic reaction region next to the separator forms an electrode section which faces the separator while the gas transportation region remote from the separator forms an electrode section facing away from the separator.

A particularly distinct reduction of the ohmic resistance is achieved in a preferred embodiment of the invention in that the hydrophilic reaction region of the capillary gap electrode is disposed in gap-free connection with the separator.

The capillary gap electrode preferably consists of a plurality of spaced-apart electrode elements that are substantially arranged in parallel with each other and are arranged in contact with the separator, thereby forming capillary gaps extending substantially in a direction perpendicular to the separator, the dimension (width) of the reaction region in a direction perpendicular to the separator being smaller, preferably considerably smaller than the width of the gas transportation region of the electrode elements, with the gas transportation region being subsequent to the reaction region.

In a preferred embodiment the electrode elements or the capillary gap electrode are made hydrophilic with a width of about ¼ of the width of the electrode elements or the width of the capillary gap electrode while the remaining part of the capillary gap electrode is made hydrophobic. To this end, the reaction region may comprise a hydrophilic, crystalline coating whereas the transportation region has a hydrophobic coating, e.g., a grease coating or a coating with a hydrophobic plastic polymer.

In another preferred embodiment of the electrolytic cell according to the invention, the strip-like electrode elements have a thickness of about 0.01 to 0.5 mm (dimension in parallel with the separator or in the direction of the width of the capillary gap), the width of the capillary gap between the spaced-apart electrode elements is about 0.05 to 0.25 mm and a thickness of the capillary gap electrodes (or the width of the electrode elements in a direction perpendicular to the separator) is at least ten times the width of the capillary gap. The width of the capillary gap depends, in particular, on the process, the operating temperature, the operating pressure and the electrolyte or permeate used. The above-mentioned parameters can also be used independently of each other in a capillary gap electrode.

The electrode elements of the capillary gap electrode which may have a shape as is, e.g., known from East German Patent Specification 285 127 or East German Patent Specification 285 128, are preferably hydrophilic in a direction in parallel with the separator and, subsequent thereto, are made hydrophobic in a larger, laterally outer region, in particular coated, the width of the hydrophilic section near the separator being about ¼ of the width of the electrode elements with the hydrophobic coating.

A preferred constructional design of the electrolytic cell is achieved in that the separator is a supply element for supplying electrolyte or permeate to the capillary gap electrode, in particular to the reaction region thereof which is adjacent to the separator without any gap. The effect of the hydrophobic gas transportation region of the capillary gap electrode, namely to keep this larger region of the capillary gap electrode virtually free of electrolyte or permeate and to use it virtually exclusively for the supply or discharge of the reaction gas, can thereby be promoted.

A diaphragm or a corresponding membrane is advantageously used as a separator. A dielectric net or grid body is partly adequate, for instance during water electrolysis, for the short-circuit proof separation of anode and cathode.

An advantageous embodiment of the electrolytic cell which effects a very compact structure of a specifically small thickness of the whole electrolytic cell is achieved in that a capillary gap electrode is respectively formed as anode and cathode in gap-free contact at both sides with the separator for separating the pair of electrodes, so that anode and cathode are only separated by the separator and connected to form a cell packet. Such an electrolytic cell is specifically suited for chlor-alkali or water electrolysis. A capillary distributor for the electrolyte or the permeate is expediently arranged over the whole width of the vertically arranged separator directly above the capillary gap electrode or electrodes. This means that an electrolytic cell which is especially suited for chlor-alkali or water electrolyis is preferably designed in an embodiment of the present invention in such a way that the separator and the capillary gap electrode or capillary gap electrodes which are adjacent thereto preferably without any gap are vertically arranged and a distributor means extends along the separator above the capillary gap electrode in funnel- or groove-like manner for supplying electrolyte or permeate along at least one surface of the plate-shaped separator, so that the electrolyte or permeate (in particular water) forms a film along a boundary surface between the separator and the hydrophilic reaction region of the capillary gap electrode or electrodes.

In another embodiment of the present invention, which is preferred for the rapid supply or discharge of the reaction gas, a gas supply or gas discharge compartment is provided laterally on the outside or axially above subsequent to the hydrophobic gas transportation region of the capillary gap electrode.

An uncomplicated cell structure, e.g., for a bipolar SPE falling-film electrolyzer (solid polymer electrolyte) of a water electrolysis can preferably be obtained with a pair of electrodes that are uninterruptedly electrically conductive.

An advantageous design of the electrolytic cell, especially for the chlor-alkali or water electrolysis can also be achieved in that the separator is plate-shaped with a pair of capillary gap electrodes which are in substantially gap-free contact with the separator, and is connected to the capillary gap electrodes to form a cell packet, with a plurality of lateral current supplies which are adjacent to the capillary gap electrodes in vertically spaced-apart fashion from the outside forming support and spacer elements between the capillary gap electrodes and a housing receiving the cell packet. With such a design, it is also not necessary to form the separator as a mechanically independently solid constructional member because the capillary gap electrode which is per se stiff, but nevertheless flexibly adaptable, especially when both anode and cathode are formed as a capillary gap electrode at both sides of the separator, mechanically stabilizes the separator, so that the separator can be very thin and of a mechanically relatively instable construction. This further reduces the thickness of the electrolytic cell and additionally permits the use of materials as separator material that although they are advantageous from an electrolytic point of view, could so far not be used, as they do not permit the use of a separator formed of such a material as an independent, mechanically stable and solid component.

A high packing density of electrochemical cells inside a housing can also be obtained in another embodiment of the present invention, especially for an SPE electrolyzer of a vertical structure, in that a plurality of cell packets, each consisting of a pair of capillary gap electrodes with an interposed separator in planar arrangement are provided separately by virtue of preferably electrically conductive partition walls, with opposite walls of the housing being formed as current supply elements. In such a case, the invention advantageously permits a vertical structure of an SPE electrolyzer in contrast to the former horizontal structure, with a water fall film (permeate) being provided and a considerably greater electrode surface being possible in this way, and the hydrophilic reaction region of the capillary gap electrode retaining the water to be decomposed in the form of a film.

In another embodiment of the present invention regarding the use of the electrolytic cell as a bipolar fuel cell, an electrolyte compartment is preferably provided between anode and cathode; the walls of the compartment forming electrolyte-permeable separators in gap-free connection with the anode or cathode respectively designed as the capillary gap electrode. A plurality of plate-shaped electrode pairs are preferably arranged in successive order and the electrolyte compartments above and/or below the pairs of electrodes are communicatingly connected. A capillary gap electrode of a first pair of electrodes may simultaneously form an electrode of another electrode pair.

In another preferred embodiment of the invention, the capillary gap electrodes which are inside the assembly can also be provided for this purpose along their opposite outer sides with a respective hydrophilic reaction region, so that the corresponding capillary gap electrodes have two peripheral hydrophilic reaction regions separated by a central hydrophobic gas transportation region.

To attain the above-mentioned object, i.e., to provide an improved capillary gap electrode for gas-developing or gas-consuming electrolytic processes and reactions independently of a specific configuration or a specific application within the scope of an electrochemical electrolytic cell, the capillary gap electrode is provided according to the invention with means for separately guiding electrolyte and reaction gas.

The capillary gap electrode which is composed of a plurality of spaced-apart electrode elements which are arranged in parallel and have arranged thereinbetween capillary gaps may have a configuration as is, e.g., known from East German Patent Specification 285 127 or East German Patent Specification 285 128 and may consist of a multitude of lamellae, tapes, film strips, or the like. A considerably improved discharge or supply of reaction gas which, in turn, does not impede the electrolytic material transport is achieved according to a preferred embodiment in that the electrode elements have at least one small hydrophilic reaction region which is preferably intended for being arranged on a separator and in which the electrolyte or permeate is received and retained under capillary action, as well as a hydrophobic gas transportation region which is adjacent thereto to the outside and which remains virtually free of electrolyte or permeate liquid due to a liquid-repellent hydrophobic configuration, in particular coating, so that the ohmic resistance of the capillary gap electrode is reduced in that the effective electrode surface is not blocked by gas bubbles, and a rapid supply or discharge of the reaction gas relative to the area of electrolytic reaction is ensured at the same time without the reaction itself being disturbed by the gas transport.

The spaced-apart electrode elements are preferably of a thickness of about 0.01 to 0.05 mm and/or the width of the capillary gap between adjacent electrode elements is about 0.05 to 0.25 mm, depending on the use of the capillary gap electrode within the scope of an electrochemical process, i.e., depending on electrochemical processes, operating temperature, operating pressure and electrolyte, and/or the capillary gap electrode has a thickness (corresponding to the width of the electrode elements) which is at least ten times the width of the capillary gap. The hydrophilic reaction region which is of strip-like configuration at least at one side of the electrode elements has preferably a width of about ¼ of the total width of the electrode elements (which corresponds to the thickness of the capillary gap electrode) while the remaining part of the capillary gap electrode is kept available as a virtually electrolyte-free (or permeate-free) gas transportation region and is kept free of electrolyte or permeate by means of a hydrophobic coating, e.g. by grease or by hydrophobic plastic polymers. The hydrophilic region is, e.g., formed by a corresponding electrolyte-attracting crystalline coating.

The above object, i.e. to provide an improved electrolysis process which results in a reduction of the ohmic resistance together with an improved material transportation and advantageous performance parameters and operating conditions for the electrolysis process, is attained in a process of the above-mentioned kind in that the electrolyte or the permeate and the reaction gas which is formed or to be consumed is guided separately at least substantially inside the capillary gap electrode, and the electrolyte does virtually not affect, or at least not significantly impair, gas transportation and gas transportation does substantially not affect, or at least not significantly impair, the electrolytic reactions.

An interior reaction region which faces the separator and is filled with electrolyte or permeate is preferably formed inside the capillary gap electrode, as well as a gas transportation region which covers a major part of the capillary gap electrode and is substantially free of liquid, and the reaction gas is supplied substantially in a direction perpendicular to the separator through the liquid-free compartment of the capillary gap of the capillary gap electrode to the electrolyte-filled reaction region thereof or discharged from the electrolyte-filled reaction region through the gas transportation region of the capillary gap electrode.

In another preferred embodiment of the inventive process, the electrolyte or permeate is supplied to only one inner hydrophilic reaction region adjacent to the separator and forms there a thin liquid film which spreads in capillary fashion in said reaction region while the hydrophobic region of the capillary gap electrode which faces away from the separator, i.e., the capillary gap, is kept virtually free of electrolyte or permeate in this region.

It is further preferred that the electrolyte or the permeate is supplied to the capillary gap electrode through the separator.

In another preferred embodiment of the invention, the electrolyte or permeate is guided in a direction substantially perpendicular to the direction of the gas transport through the capillary gap electrode along the separator or along a boundary surface between the separator and the electrolyte- or permeate-receiving hydrophilic reaction region of the capillary gap electrode.

Other preferred embodiments of the subject matter of the invention, in particular of the process of the invention, are outlined in the remaining subclaims.

Hence, the fact that a capillary gap electrode is provided wherein the electrolyte and the reaction gas produced or consumed in the course of the electrolytic process are guided separately is of importance to the present invention, so that the electrolyte or the permeate does not impede the transportation of the reaction gas and the reaction gas does not impair the electrolytic reaction. To this end, use is made of a capillary gap electrode which has supplied thereto the electrolyte or the permeate only in one hydrophilic reaction region which faces the neighboring separator and which is preferably next thereto whereas the region of the capillary gap region which faces away from the separator has a hydrophobic characteristic and the capillary gap, therefore, remains free of electrolyte or permeate in this region. The electrolyte can only be supplied to the capillary gap electrode through the separator, also by penetrating therethrough, e.g. when the walls of an electrolyte compartment form the separator or separators or during SPE electrolysis with water. The electrolyte/permeate (in particular water) can also be supplied in the form of a falling film along the separator surface to the side facing the capillary gap electrode, in particular from above near an upper side of the capillary gap electrode. The reaction gas is discharged or supplied through regions in the capillary gap electrode that are free of electrolyte or permeate, expediently at the side of the capillary electrode facing away from the separator.

An especially advantageous method is that the falling film of electrolyte or permeate which is supplied from above to the capillary gap electrode with the aid of the separator is expanded in the electrode over the whole side adjacent to the separator (hydrophilic reaction region) of the capillary gap electrode and fixed in this form and that the reaction gas is discharged and supplied substantially in a direction perpendicular to the separator through the capillary gap regions of the hydrophobic capillary gap electrode that are free of electrolyte or permeate. This is also possible via a gas collection or supply compartment which is positioned above the hydrophobic gas transportation region of the capillary gap electrode. The separator is preferably shaped in the form of a diaphragm or a membrane, at least one of the two electrodes being formed as a capillary gap electrode which is adjacent to the separator at least predominantly, with the capillary gap electrode consisting of a plurality of adjacent electrode elements which are arranged in parallel with one another and whose distance from one another is dimensioned that it creates a capillary effect.

The guide means of the capillary gap electrode for separately guiding electrolyte or permeate and reaction gas consist preferably in the formation of a small, electrolytically active reaction region which rests on the separator and is made hydrophilic while the other region of the capillary gap electrode which faces away from the separator has hydrophobic characteristics and preferably comprises a corresponding coating. Optimum performance parameters of an electrolytic cell or of the capillary gap electrode are achieved when the capillary gap electrode actually rests on the separating element without any gap so as to form a continuous electrolytic film. A gap-free contact effects a sudden decrease in electrical resistance and a sudden improvement of the material conversion and effects a distinct increase in the efficiency of the capillary gap electrode and the electrolytic cell, respectively, and of the electrolysis process. This is achieved in the present case by the prevention of cavities or interspaces between the capillary gap electrode and the separator and thus by the prevention of gas accumulations and the coagulation of gas bubbles between separator and capillary gap electrode which might result in the formation of a gas film which impedes the electrolysis process as an electrical isolator. Moreover, a gap-free contact of two capillary gap electrodes from both sides on the separator yields a high mechanical strength.

In an expedient embodiment of the electrolytic cell, a capillary distributor for the electrolyte extends over the whole width of the vertically arranged separator directly above the capillary gap electrode. A gas discharge and supply compartment may follow the capillary gap electrode side which faces away from the separator.

It has turned out to be of advantage that the electrode elements preferably have a thickness of 0.01 to 0.05 mm and that the width of the capillary gap is between 0.05 and 0.25 mm, depending on the electrolysis process, the operating temperature, the operating pressure and the kind of electrolyte or permeate. The width of the electrode elements which simultaneously forms the thickness of the capillary gap electrode is preferably at least ten times the width of the capillary gap.

An especially small thickness of the electrolytic cell is obtained when anode and cathode are only separated by the separator and united into a cell packet. Such an electrolytic cell is especially suited for chlor-alkali or water electrolysis. By contrast, if the electrolyte is to be passed through an electrolyte compartment between the electrodes, it is expedient to design the walls of the electrolyte compartment as electrolyte-permeable separators, with the electrolyte being only inside the electrolyte compartment and the separator and the adjacent hydrophilic boundary layer, the active reaction region of the capillary gap electrode. With this type of an electrolytic cell, it is also possible to unite a plurality of anodes and cathodes with interposed electrolyte compartments into a cell packet; the electrolyte compartments being also in flow communication with one another.

The function of the present invention shall now be summarized in the following:

With conventional capillary gap electrodes, the (normally horizontal) capillaries between the electrodes are filled with electrolyte. This means that the capillary gap electrode of the conventional type effects a complete filling of the capillary gap with electrolyte or permeate due to the capillary effect. Even with an irregular supply of the electrolyte or permeate, especially with a supply in the form of a falling film, a capillary gap electrode, therefore, permits a uniform distribution of the electrolyte or permeate over the whole electrode surface and over the whole thickness thereof. While the first-mentioned feature, i.e., a large active electrode surface impregnated with electrolyte or permeate, is desired, the latter, i.e., a complete filling of the capillary gap electrode with electrolyte or permeate, impedes the discharge and supply of the reaction gas through the capillary gap electrode, with the effect that the gas bubbles considerably impair the intensity of the electrolytic reaction in the active region. The gas produced or needed during electrolysis forms bubbles which have to move out of the capillary gaps to the outside. With a gas-producing electrolytic reaction, the gas bubbles formed in the reaction region of the electrodes are very violently forced by the surface tension of the electrolyte or permeate from the solid phase in the middle of the gap of the electrode elements to the outside. As a consequence, there is a great material movement in the solid-liquid phase and thus a high material exchange due to the reduction of the Nernst layer thickness.

To avoid a gas isolating effect within the electrode with a resultant increase in power consumption or decrease in power yield and also an impairment of the electrolytic reaction by the gas bubbles, the capillary gap electrode is provided according to the invention with guide means which ensure a separate guiding of electrolyte or permeate and reaction gas inside the electrode. These guide means are preferably formed by dividing the electrode into a hydrophilic reaction region and a hydrophobic gas transportation region, preferably by means of a corresponding hydrophilic or hydrophobic coating, the hydrophilic type of the capillary gap electrode in only a small region, which is preferably very close to the separator, intensifying the capillary effect and ensuring the propagation of the electrolyte or permeate in this region. The hydrophobic type of the other and larger region of the capillary gap electrode offsets the capillary effect and, therefore, keeps this gas transportation region free of electrolyte or permeate, so that gas can be transported in an unhindered way between the electrolytically active region and the side of the capillary gap electrode that faces away from the separator. A realizable, preferably gap-free contact of the capillary gap electrode with the separator permits, in turn, a more compact design. Moreover, the construction of the separator as a mechanically independent constructional element is not necessary because the capillary gap electrode which is per se stiff, but nevertheless flexible, especially when used as both an anode and a cathode at both sides of the separator, takes over the mechanical stabilization thereof and results in a sufficient mechanical stability of the cell packet, so that the separator itself can be designed as a thin and relatively instable separator. This further reduces the thickness of an electrolytic cell with such a structure and also permits an optimum material selection for the separator under electrochemical aspects without the inherent mechanical stability having to be taken into account.

To be able to discharge the resultant gas bubbles within the capillary gap electrode in an improved way or to supply them to the hydrophilic reaction region of the capillary gap electorde in an improved way, this region should be about ¼ of the width of the electrode elements or the thickness of the capillary gap electrode, with the electrolyte or the permeate preferably adhering in this hydrophilic reaction region and being adapted to be fixed. The electrolyte or the permeate should preferably be shaped as a film along the separator, i.e., should have a minimum extension in the current direction and electric field direction perpendicular to a separator. Following the electrolytic film, the capillary gaps of the capillary gap electrode should be without electrolyte. The reaction gas formed in the electrolytic film (or permeate film) can thereby flow out of the capillary gap electrode or can be supplied from the vicinity in an unhindered way to the electrolytic film. The separate guidance of reaction gas and electrolyte (or permeate) is thus achieved in that a small region of the capillary gap electrode is made hydrophilic or provided with a hydrophilic coating and attracts the electrolyte (or permeate) and effects the distribution of the electrolyte or permeate to obtain a surface-covering film in connection with the separator whereas a large region of the capillary gap electrode is made hydrophobic or is provided with a hydrophobic coating, so that the introduction of electrolyte (or permeate) into this region of the capillary gap electrode is virtually prevented and this region is therefore available for gas transportation.

BRIEF DESCRIPTION OF THE DRAWINGS

The present invention shall now be explained in more detail with reference to embodiments and accompanying drawings, in which.

DETAILED DESCRIPTION OF PREFERRED EMBODIMENTS

Figure 1:
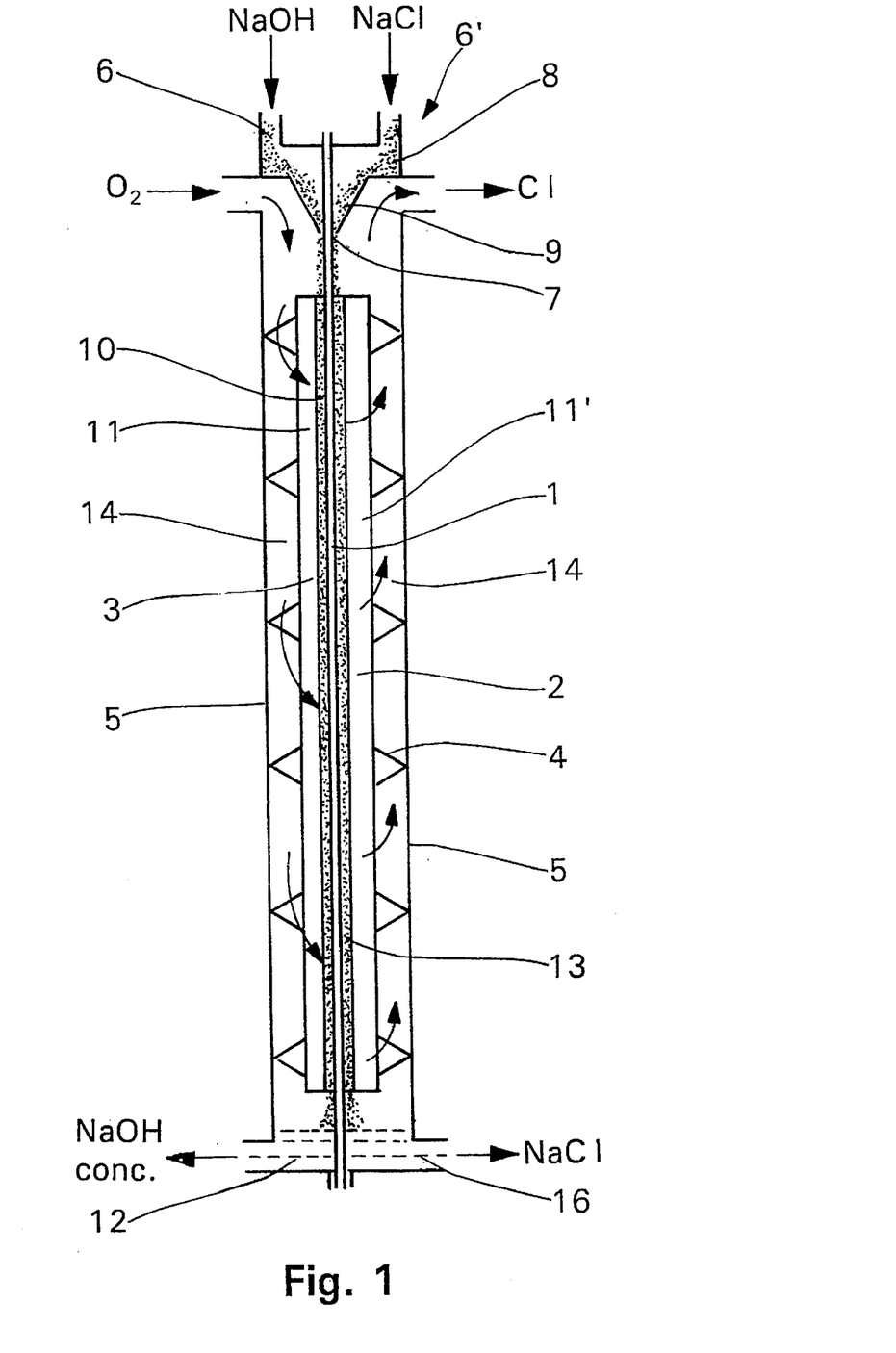
FIG. 1 is a diagrammatic illustration of a falling-film electrolytic cell in cross-section, in particular for chlor-alkali hydrolysis with an oxygen-consuming cathode according to a first embodiment.
Figure 4:
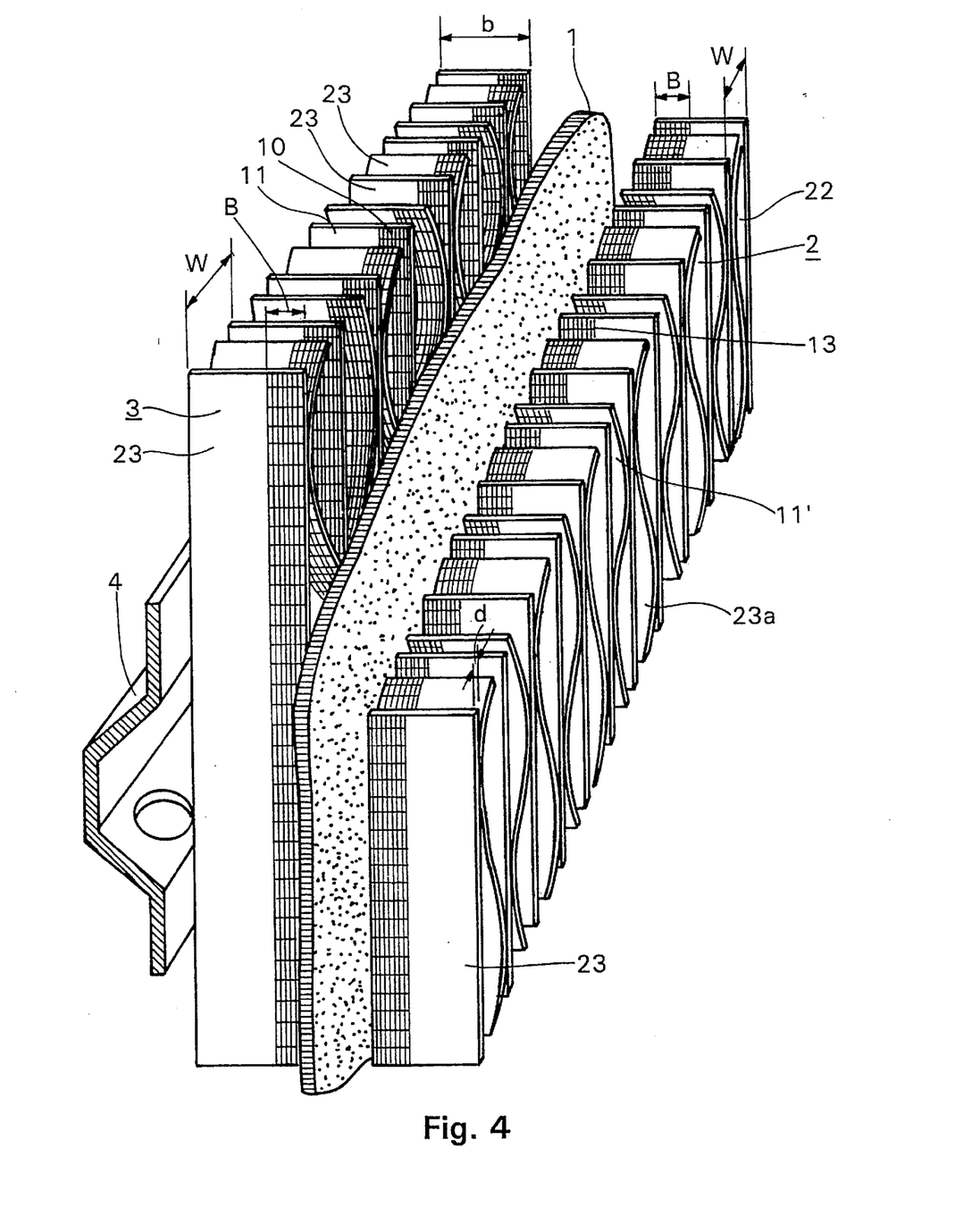
FIG. 4 is a diagrammatic illustration of an enlarged detail of a capillary gap electrode assembly for an electrolytic cell according to FIGS. 1 to 3.

FIG. 1 is a diagrammatic cross-sectional illustration of an electrolytic cell as a falling-film apparatus for chlor-alkali electrolysis with an oxygen-consuming cathode. The electrolytic cell, whose detailed structure is shown by way of example in a diagrammatic perspective representation in FIG. 4, is equipped in its center with a plate-shaped electrolyte-impermeable, gas-permeable separator 1 which is contacted without any gap and at both sides by the capillary gap electrode 2 as the anode and the capillary gap electrode 3 as the cathode; the electrodes being also of a plate-shaped configuration on the whole. The capillary gap electrodes 2 and 3, in turn, are supported by vertically spaced-apart current supply rails 4 against a wall of a housing 5 of the electrolytic cell. Diluted lye is supplied from above through a capillary distributor 6' which feeds the electrolyte in a falling film on the surface of separator 1 and which, in turn, consists of a distributor compartment 6 and a distributor bottom 8 which is followed by a wedge-shaped distributor channel 9 for level adjustment of the supplied electrolyte over the whole electrode width and the width of separator 1, and of a capillary distributor 7. The latter provides for a falling film of electrolyte of uniform thickness along the separator surface. A gap width of the capillary distributor 7 is determined in response to the necessary amount of electrolyte.

The structure of the two capillary gap electrodes 2, 3 provided as anode and cathode, which structure is illustrated more clearly in FIG. 4, is chosen such that an interior strip-like section which is in contact with separator 1 forms a hydrophilic reaction region 10 and 13, respectively, in which the falling-film electrolyte is received and retained under the capillary action of the capillary gap electrodes 2, 3 in the capillary gaps 22 thereof (see FIG. 4) while the remaining region of the capillary gap electrodes 2, 3 which follows the hydrophilic reaction region 10, 13 to the outside forms a hydrophobic gas transportation region 11, 11' whose hydrophobic properties, in particular hydrophobic coating, exceed the capillary action of the capillary gaps 22 of the capillary gap electrodes 2 and 3, so that the hydrophobic electrode sections which are provided as gas transportation regions 11, 11' remain free of electrolyte and the falling-film electrolyte spreads in a small film which is as thin as possible along separator 1 within the hydrophilic reaction region 10, 13 of the capillary gap electrodes 2, 3. The resultant falling film of electrolyte is therefore received by the hydrophilic reaction region 10, 13 of the vertically electrolyte-permeable capillary gap structure of anode 2 and cathode 3 in contact with separator 1, which is a membrane or a diaphragm. Oxygen is supplied to the electrolytic cell from the outside at a small pressure; the oxygen flowing through a gas supply compartment 14 and the capillary gap 22 of the hydrophobic gas transportation region 11 of cathode 3. The concentrated electrolyte flows as a falling film downwards and is discharged from a collecting compartment 12 at the bottom of the electrolytic cell. The anode part which is at the right side in FIG. 1 has a corresponding function. The structure of the two capillary gap electrodes 2, 3 is the same at both sides of separator 1. Sodium chloride solution is supplied via distributor 6'. The chlorine gas obtained as an electrolytic reaction result passes from the hydrophilic reaction region 13 of anode 2 through the capillary gap 22 of anode 2 into the adjacent gas-discharging compartment 14 and from said compartment to the outside. Weak brine is discharged from a collecting compartment 16 at the bottom of the electrolytic cell.

The capillary gap electrodes themselves may be configured in different ways, as are, e.g., known from East German Patent Specification 285 127, East German Patent Specification 285 128. The capillary gap electrodes 2, 3 consist each of plane-parallel electrode elements 23 which form small strips that are each spaced apart from one another in the direction of the main plane of separator 1 by a waved spacer electrode element 23a to form the capillary gaps 22. Inside the hydrophilic reaction region 10, 13, the electrolyte can also be transported vertically through the capillary gap electrodes 2 because the waved spacer electrode elements 23a do virtually not impede a capillary action within the hydrophilic reaction region 10, 13 in the vertical direction which is plane-parallel with separator 1.

Of course, other electrode element configurations in lamella, tape or film-strip form with integral beads, shapes, etc. could also be chosen, as is known from the prior art (cf., for instance, WO 91/00379). In the present embodiment, an uninterrupted electrolytic film is formed through intimate contact of the respectively interior hydrophilic reaction region 10, 13 on separator 1 in this electrode region. By contrast, the hydrophobic structure of the gas transportation regions 11, 11' of the capillary gap electrodes 2, 3 has the effect that the liquid-repellent effect in these parts of the capillary gap electrodes 2, 3 offset the capillary effect, so that the electrodes remain free of electrolyte in the gas transportation regions 11, 11'.

In a preferred embodiment, thickness d of the electrode elements 23 and of the spacer electrode elements 23a, respectively, is between 0.01 and 0.05 mm and width W of the capillary gap is between 0.05 and 0.25 mm, depending on the electrolysis process, the operating temperature, the operating pressure and the type of electrolyte. Width b which represents the thickness of the capillary gap electrodes 2, 3 at the same time is at least ten times width W of the capillary gap 22. The electrolyte should be as thin as possible in the hydrophilic reaction regions 10, 13 of the capillary gap electrodes 2, 3 at the anode side and the cathode side. Width B of the hydrophilic reaction region 10 and 13, respectively, is preferably about ¼ of width b of the electrode elements 23 and 23a, respectively, i.e., about ¼ of the electrode thickness.

The hydrophilic reaction region 10, 13 which is formed with the aid of an electrolyte-attracting, hydrophilic, preferably crystalline coating provides for a guide means which separates electrolyte and reaction gas within the capillary gap electrodes 2, 3. At the same time, the capillary effect is intensified in this region, and it is possible, at a thin film thickness of the electrolyte, to have large structural units of the electrolytic cell with a correspondingly high throughput per time unit. The hydrophobic part of the electrode elements 23, 23a which serves as a gas transportation section for oxygen gas supply at the cathode side and chlorine gas discharge at the anode side is also formed by a corresponding liquid-repellent coating of this surface section of the electrode elements 23, 23a, for instance, by a grease- or liquid-repellent polymer coating. Current is supplied by the current rails 4 which directly rest on the hydrophobic outer side of the capillary gap electrodes 2, 3. Gas transportation by the electrode is preferably in a direction perpendicular to separator 1, i.e., towards the electric field between anode 2 and cathode 3 in combination with the outer gas collecting compartments 14. These, however, could also be dispensed with, as will become apparent from an embodiment of the invention which will be explained in the following. In this case, the reaction gas is discharged from the hydrophobic parts of the capillary gap 22 upwards on the face relative to the capillary gap electrodes 2, 3, i.e., substantially in parallel with separator 1.

Figure 2:
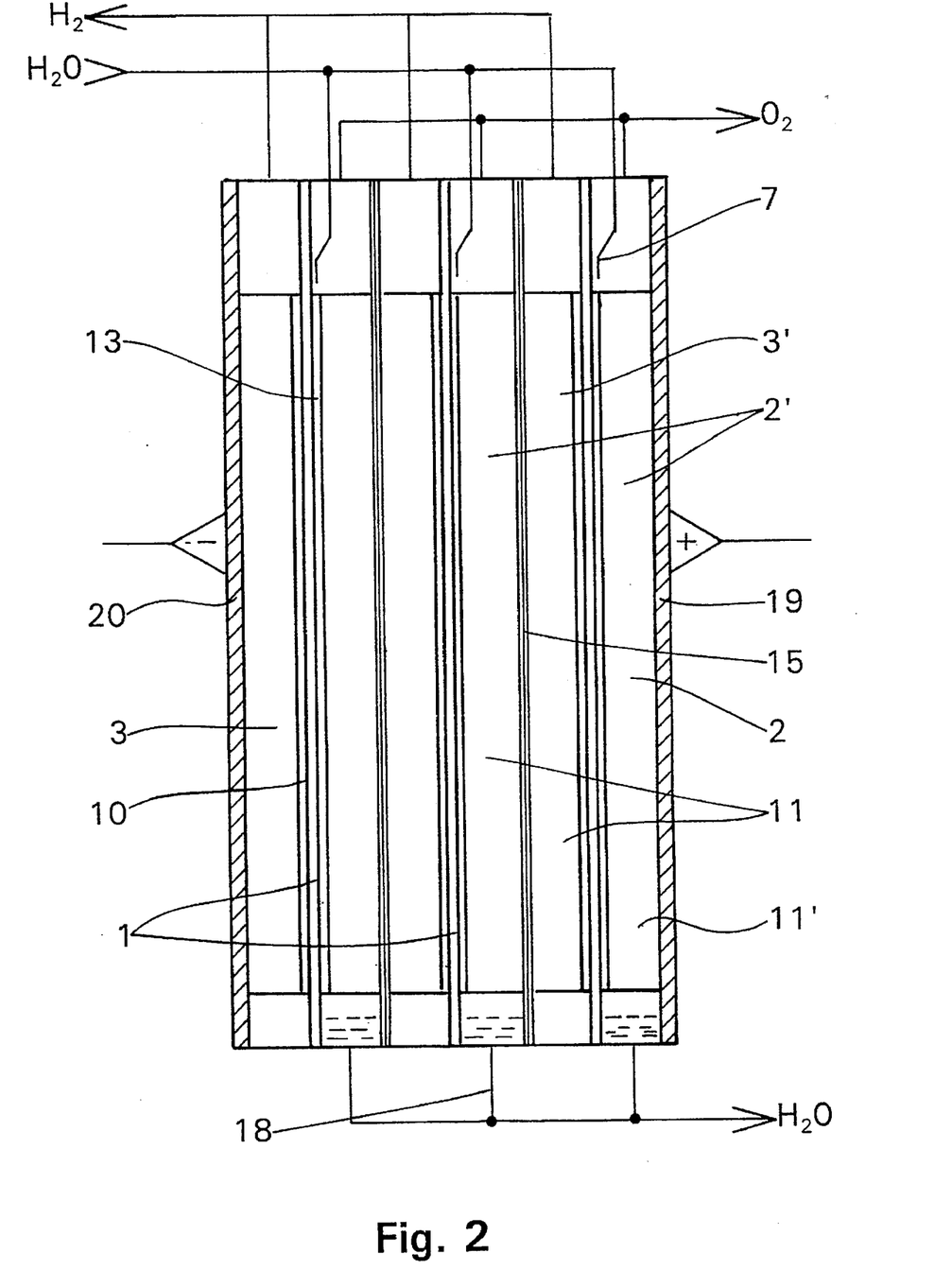
FIG. 2 is a diagrammatic illustration of a bipolar SPE falling-film electrolyzer for water electrolysis according to another embodiment of the present invention.

FIG. 2 shows an SPE electrolyzer (solid polymer electrolyte), i.e., a cell block consisting of a plurality of cell packets with solid electrolyte which, in turn, consist of a pair of capillary gap electrodes as anode 2 and cathode 3, separated, e.g., by a membrane having electrolytic characteristics.

Conventional SPE cells for water electrolysis normally comprise a membrane as the separator including a thin porous electrode as coating at both sides for forming anode and cathode. To decompose water, the cell packet is normally arranged in a horizontal plane, and it is only the upper side which is flooded with water. The efficiency of such an assembly is relatively low because of the small surfaces.

In the present embodiment, the electrolyzer may advantageously be of a vertical and very compact structure with the aid of the capillary gap electrode assembly already explained in connection with FIGS. 1 and 4 and a water fall film. A precondition for such a simple compact structure is that the electrode elements 23 (see FIG. 4 by way of example) which form the capillary gap electrodes 2, 3 that rest on separator 1 as anode and cathode without any gap should be uninterruptedly electrically conductive; the capillary gap electrodes 2, 3 being again divided into the hydrophilic reaction region 10 and 13, respectively, and the larger hydrophobic gas transporation region 11, 11'(as explained above).

In such a case, the hydrophilic reaction region 10, 13 of the capillary gap electrodes 2, 3 serves the storage and reception of the water as the permeate liquid to be decomposed in the form of a film and retains said water film while the gas transportation regions 11, 11' of the capillary gap electrodes 2, 3 that are described as hydrophobic remain free of water and serve the separated discharge of oxygen and hydrogen. It is thus possible to obtain substantially larger cell dimensions at a reduced ohmic resistance of the cell and thus a considerably increased efficiency of the electrolyzer which is supported by the gap-free contact of the capillary gap electrodes with membrane 1. In the present case, the SPE electrolyzer according to FIG. 2 has three parallel cell packets in a row that consist each of a capillary gap anode and cathode with interposed membrane 1 and are each connected within the bipolar cell block by a thin, electrically conductive partition 15.

In this embodiment, direct current supply to the capillary gap electrodes 2, 3 and the electrolyte compartments and laterally external gas discharge compartments are not at all necessary, so that the area occupied by the electrolyzer is substantially reduced and a very compact cell block is obtainable. In this case, too, the pure water used is supplied at the anode side by the capillary distributor 7. As a result, SPE cells are also operable with vertical electrode assemblies. Excessive water is passed across collector 18 from the electrolyzer. The housing walls 19, 20 simultaneously serve the current supply at the anode side and cathode side.

Figure 3:
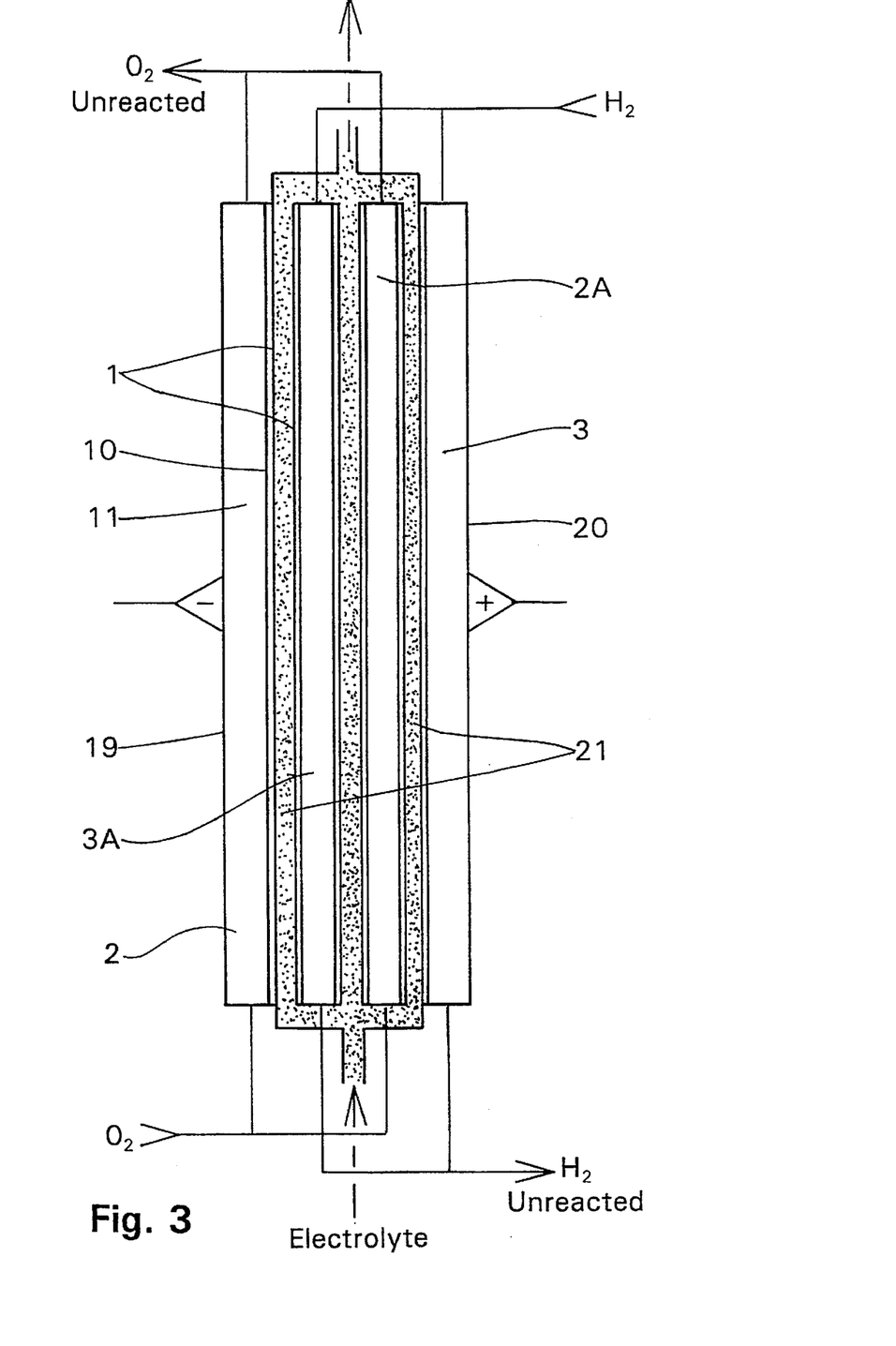
FIG. 3 is a diagrammatic illustration of a cross-section of a bipolar fuel cell with electrolyte compartments according to another embodiment of the present invention.

FIG. 3 shows another embodiment in the form of a bipolar fuel cell for current generation in vertical cross-section. As for the details of the configuration of the capillary gap electrodes, which are used as anode 2 and cathode 3, respectively, reference is again made to the preceding figures and to FIG. 4. In this case, three cell packets that consist each of anode 2, cathode 3 and at least one separator 1 and have an associated electrolyte supply are formed by a total of two electrode pairs, i.e., a respective capillary gap electrode with an interior hydrophilic reaction region which faces the electrolyte and separator 1 and, moreover, with a hydrophobic gas transportation region. The interior electrodes, namely the capillary gap cathode 3A and the interior capillary gap anode 2A form another pair of electrodes and a cell packet, so that the interior electrodes 2A, 3A belong each to two cell packets. To this end, anode 2A and cathode 3A are each hydrophilically coated at both sides in an edge region and have a hydrophilic reaction region 10, 13 along their two plane-parallel outer surfaces, while the inner central region 11 of anode 2A and cathode 3A is made hydrophobic for vertical gas transportation. In this case, separators 1 are respectively provided in combination with every exterior side of a hydrophilic reaction region 10 of the capillary gap electrodes 2, 3, 2A, 3A, so that the pairs of electrodes 2, 3A, 3, 2A, 2A, 3A are each separated by two separators 1 that, in turn, enclose a respective electrolyte compartment 21. The three electrolyte compartments 21 formed in this way are interconnected in communicating fashion upstream and downstream of the capillary gap anodes 2, 2A and the capillary gap cathodes 3, 3A, respectively, and the electrolyte or resultant water preferably flows therethrough from the bottom to the top (in FIG. 3 in the direction of the arrow). The hydrophilic reaction regions 10, 13 of anodes 2, 2A and cathodes 3, 3A can be wetted and form the place of the electrolytic reaction while the other hydrophobic gas transportation regions 11 serve the supply and discharge of the reaction gases hydrogen and oxygen of the fuel cell.

Fuel, such as hydrogen, is supplied to cathodes 3, 3A and oxygen or air to anodes 2, 2A under pressure. Electrically conductive housing walls 19, 20 which are not shown in more detail and provided in conjunction with the exterior cathode 3 and anode 2, respectively, serve current tapping. In accordance with the operating temperatures and the electrolytes used, the hydrophilic reaction regions 10 of the capillary gap electrodes 2, 2A, 3, 3A are equipped with corresponding catalysts; in the case of an alkaline low-temperature cell, e.g. anodically of titanium-doped nickel and cathodically of nickel-doped silver. In another embodiment, the catalysts may also be provided on separators 1 and the capillary gap electrodes 2, 2A, 3, 3A serve the material transportation and balanced current conduction.

In comparison with the embodiment regarding a water electrolyzer according to FIG. 2, the electrically conductive partitions 15 are here dispensed with, whereby the thickness of the cell packets of fuel cells in combination with the multivalent use of the interior electrodes 2A, 3A can be reduced by about 50%.

Extremely tightly stacked large electrolysis reactors can be implemented with the process, the capillary gap electrode and the electrolytic cells composed of such capillary gap electrodes. Apart from their compact configuration, another advantage of the electrolysis reactors is that they have a substantially lower ohmic resistance than known electrolytic cells, so that there is more current or a reduced current demand and both the material conversion per time unit and the efficiency of the respective electrolyzer can be improved.

A further increase in the conversion rate is due to the fact that the electrolyzers can be operated at increased pressures. The capillary gap electrodes can be manufactured by machine and thus in a very effective way. Their durability is very high, resulting in a long lifetime of the capillary gap electrodes and thus of the electrolytic cells.

We claim:

1. An electrolytic cell for gas-developing or gas-consuming electrolytic reactions including chlor-alkali or water electrolysis, or fuel cell current generation, the cell comprising an electrolyte and at least one pair of electrodes separated by at least one separator lying along a plane, the electrodes comprising a plurality of capillary gap electrodes having at least one hydrophilic electrolytically active reaction region in gap-free contact with the separator and at least one hydrophobic electrolytically inactive gas transportation region, wherein the reaction region guides electrolyte or permeate separately from the gas transportation region which guides reaction gas;

the plurality of capillary gap electrodes comprises a first capillary gap electrode provided as an anode and a second capillary gap electrode provided as a cathode, the first and second capillary gap electrodes being arranged on opposite sides of the separator;

each of the capillary gap electrodes comprises a plurality of electrode elements provided in the manner of strips parallel to the plane of the separator and in contact with the separator which form capillary gaps extending in a direction substantially perpendicular to the plane of the separator, a portion of each electrode element having a hydrophilic coating and a portion of each electrode having a hydrophobic coating, such that a width of the portion of the electrode element near the separator and having the hydrophilic coating is about one fourth of a width of each electrode element which is hydrophobically coated, the widths being measured in a direction substantially perpendicular to the plane of the separator;

a thickness of each electrode element as measured in a direction substantially parallel to the plane of the separator is from about 0.01 mm to about 0.05 mm, a width of each capillary gap as measured between two adjacent electrode elements in a direction substantially parallel to the plane of the separator is from about 0.05 mm to about 0.25 mm, and a thickness of the capillary gap electrode as measured in a direction perpendicular to the plane of the separator is at least ten times the width of the capillary gap.

2. The electrolytic cell according to claim 1, wherein at least one of the capillary gap electrodes has two hydrophilic reaction regions on opposite external sides thereof and is separated by the hydrophobic gas transportation region located in a central part of the electrode.

3. The electrolytic cell according to claim 1, wherein the separator is a supply element for electrolyte or permeate supplied to the hydrophilic reaction region of the capillary gap electrode which contacts the separator without a gap.

4. The electrolytic cell according to claim 3, wherein the separator is a diaphragm or a membrane.

5. The electrolytic cell according to claim 1, wherein the electrolyte or permeate forms a film along a boundary surface of the capillary gap electrode along the separator in the hydrophilic reaction region of the capillary gap electrode, the separator and the capillary gap electrode being vertically arranged and a distributor means being provided which extends along the separator in an upper portion of the electrolytic cell above the capillary gap electrode for supplying the electrolyte or permeate in a form of a falling film.

6. The electrolytic cell according to claim 1, wherein a gas supply or gas discharge compartment is provided, the compartment being external to or axially above the hydrophobic gas transportation region and laterally to the capillary gap electrode.

7. The electrolytic cell according to claim 1, wherein the pair of electrodes is continuously electrically conductive.

8. The electrolytic cell according to claim 1, wherein the separator is substantially planar and together with the capillary gap electrodes resting on the separator as anode and cathode forms a cell packet, a plurality of spaced-apart supply rails which abut an exterior portion of the capillary gap electrodes forming support and spacer elements relative to a housing accommodating the cell packet.

9. The electrolytic cell according to claim 8, wherein a plurality of cell packets are provided to the electrolytic cell, each packet comprising a pair of capillary gap electrodes arranged in planes parallel to the plane of the separator, the separator being interposed between the electrodes, the cell packets separated by electrically conductive partition walls and the housing having external walls provided as current supply elements.

10. The electrolytic cell according to claim 1, wherein the capillary gap electrodes are provided as an anode and a cathode, the anode and the cathode being arranged on opposite sides of an electrolyte compartment, the compartment having walls which form electrolyte-permeable separators in gap-free connection with at least one of the anode and the cathode.

11. The electrolytic cell according to claim 10, wherein a plurality of substantially planar pairs of electrodes are arranged continguously and the electrolyte compartments are communicatingly interconnected on at least one of an upstream and a downstream end of the pairs of electrodes.

12. An electrolytic cell according to claim 11, wherein a first pair of electrodes and a second pair of electrodes each simultaneously comprise the same capillary gap electrode, the capillary gap electrode comprised within both the first and second pair of electrodes comprising two hydrophilic reaction regions located on opposite external sides of the capillary gap electrode.

13. An electrolysis process for gas-developing or gas-consuming processes in an electrolytic cell according to claim 1, comprising the steps of separately guiding the electrolyte or permeate and the reaction gas which is formed or to be consumed substantially within the capillary gap electrode, maintaining the reaction gas substantially unaffected by the electrolyte or permeate, and maintaining the electrolyte or permeate substantially unaffected by the reaction gas.

14. The process according to claim 13, further comprising discharging the reaction gas in a direction substantially perpendicular to or substantially parallel to the plane of the separator and through said hydrophobic gas transportation region towards the hydrophilic reaction region, the hydrophilic reaction region facing the separator and being filled with electrolyte and the gas transportation region covering at least one half of a surface area of the capillary gap electrode and being substantially free of electrolyte.

15. The process according to claim 13, further comprising supplying the electrolyte or permeate to an inner hydrophilic reaction region adjacent the separator and subsequently spreading the electrolyte or permeate in capillary fashion in the hydrophilic reaction region, while maintaining the hydrophobic gas transportation region facing away from the separator substantially free of electrolyte or permeate.

16. The process according to claim 13, further comprising supplying the electrolyte or permeate to the hydrophilic reaction region of the capillary gap electrode through the separator in a direction substantially perpendicular to the plane of the separator and to a direction of transport of the reaction gas.

17. The process according to claim 16, wherein said electrolyte or permeate is supplied in a form of a falling film.

18. The process according to claim 13, further comprising conveying the electrolyte or permeate in an electrolyte compartment positioned between two capillary gap electrodes serving as an anode and a cathode, and supplying the electrolyte or permeate to the compartment through a wall of the compartment which is designed as an electrolyte-permeable separator to the capillary gap electrode.

19. The process according to claim 18, further comprising supplying the electrolyte or permeate in the form of a falling film to an area proximate an upper portion of the electrolytic cell to a first and a second surface of the separator, the separator being between two capillary gap electrodes each having a hydrophilic reaction region located on a side of the electrode adjacent the separator, the falling film being along the first and the second surfaces of the separator and the reaction gas being discharged or supplied through regions in the capillary gap electrode that are substantially free of electrolyte or permeate.

20. The process according to claim 19, further comprising spreading the falling film of electrolyte or permeate over the hydrophilic reaction region of each capillary gap electrode adjacent the separator, maintaining the film in such form and discharging or supplying the reaction gas through capillary gaps in the capillary gap electrode substantially free of electrolyte or permeate in a direction substantially perpendicular to the plane of the separator.

21. A capillary gap electrode for gas-developing or gas-consuming electrolytic reactions, including chlor-alkali or water electrolysis, or fuel cell current generation, the capillary gap electrode comprising a plurality of spaced-apart electrode elements forming capillary gaps therebetween, and comprising at least one hydrophilic, electrolytically active reaction region and a hydrophobic, electrolytically inactive gas transportation region, wherein the reaction region guides electrolyte or permeate separately from the gas transportation region which guides reaction gas;

the hydrophilic reaction region being in contact with a separator;

a width of each capillary gap as measured transversely from one electrode element to an adjacent electrode element is about 0.05 mm to about 0.25 mm, the electrode elements being arranged in planes lying substantially parallel to and spaced apart from each other, a width of the hydrophilic reaction region is about one fourth of a total width of the electrode elements, both widths measured along a longitudinal plane of each element, and a thickness of each electrode element measured in a direction perpendicular to said longitudinal plane of each element is about 0.01 mm to about 0.05 mm.

22. The capillary gap electrode according to claim 63, wherein the capillary gap electrode comprises two hydrophilic reaction regions located on opposite external sides thereof, the two hydrophilic reaction regions being separated by the hydrophobic gas transportation region located in a central part of the electrode.

23. An electrolytic cell for gas-developing or gas-consuming electrolytic reactions including chlor-alkali or water electrolysis, or fuel cell current generation, the cell comprising an electrolyte and at least one pair of electrodes separated by at least one separator lying along a plane, the electrodes comprising a plurality of capillary gap electrodes having at least one hydrophilic electrolytically active reaction region in gap-free contact with the separator and at least one hydrophobic electrolytically inactive gas transportation region, wherein the reaction region guides electrolyte or permeate separately from the gas transportation region which guides reaction gas;

the plurality of capillary gap electrodes comprises a first capillary gap electrode provided as an anode and a second capillary gap electrode provided as a cathode, the first and second capillary gap electrodes being arranged on opposite sides of the separator;

a thickness of each electrode element as measured in a direction substantially parallel to the plane of the separator is from about 0.01 mm to about 0.05 mm, a width of each capillary gap as measured between two adjacent electrode elements in a direction substantially parallel to the plane of the separator is from about 0.05 mm to about 0.25 mm, and a thickness of the capillary gap electrode as measured in a direction perpendicular to the plane of the separator is at least ten times the width of the capillary gap; and at least one of the capillary gap electrodes has two hydrophilic reaction regions on opposite sides thereof and is separated by the hydrophobic gas transportation region located in a central part of the electrode.

\* \* \* \* \*